US011458443B2

(12) United States Patent
Noall et al.

(10) Patent No.: US 11,458,443 B2
(45) Date of Patent: Oct. 4, 2022

(54) WATER BOTTLE DEVICE ASSEMBLY

(71) Applicant: Infuze, LLC, Wellsville, UT (US)

(72) Inventors: Daniel Noall, Wellsville, UT (US); Nathan Erickson, Beaverdam, UT (US); Shane McKenna, Salt Lake City, UT (US)

(73) Assignee: Infuze, LLC, Wellsville, UT (US)

( * ) Notice: Subject to any disclaimer, the term of this patent is extended or adjusted under 35 U.S.C. 154(b) by 764 days.

(21) Appl. No.: 16/255,497

(22) Filed: Jan. 23, 2019

(65) Prior Publication Data

US 2019/0282979 A1   Sep. 19, 2019

Related U.S. Application Data

(60) Provisional application No. 62/620,817, filed on Jan. 23, 2018.

(51) Int. Cl.
*B01F 33/00* (2022.01)
*B01F 33/501* (2022.01)
(Continued)

(52) U.S. Cl.
CPC ........... *B01F 33/50111* (2022.01); *A23L 2/56* (2013.01); *A45F 3/18* (2013.01);
(Continued)

(58) Field of Classification Search
CPC ................ B01F 13/0022; B01F 5/0428; B01F 15/0223; B01F 3/0865; B01F 5/0413;
B01F 2215/0022; A23L 2/56; A45F 3/18; A47G 19/2272; B65D 47/06; B65D 51/2821; B65D 81/3222; B65D 51/2892;
(Continued)

(56) References Cited

U.S. PATENT DOCUMENTS 8,464,633 B2 * 6/2013 Anson .................... C02F 1/002
99/323
D767,336 S   9/2016 Waggoner et al.
(Continued)

FOREIGN PATENT DOCUMENTS

WO   2005005030 A1   1/2005
WO   2017152192 A1   9/2017
(Continued)

OTHER PUBLICATIONS

Australian Patent Office, "Second Examination Report," for Australian patent application No. 2019280070 dated Jun. 17, 2021.
(Continued)

*Primary Examiner* — Anshu Bhatia
(74) *Attorney, Agent, or Firm* — Dentons Durham Jones Pinegar (57) ABSTRACT

A water bottle system for adding an additive, which may be flavoring, to the line of flow without contaminating the main reservoir. The system may include a water bottle with a lid feature that may maintain a flavor that may be infused into the water within the water bottle. The infusion of the additive may be adjusted by a user to have the desired concentration of additive to a user's liking. The additive cartridge may be reusable or disposable depending on a user's preference.

20 Claims, 12 Drawing Sheets

(51) Int. Cl.

| | | |
|---|---|---|
| *A23L 2/56* | (2006.01) | |
| *A45F 3/18* | (2006.01) | |
| *A47G 19/22* | (2006.01) | |
| *B65D 47/06* | (2006.01) | |
| *B65D 51/28* | (2006.01) | |
| *B65D 81/32* | (2006.01) | |
| *A47J 43/27* | (2006.01) | |
| *B01F 23/451* | (2022.01) | |
| *B01F 25/312* | (2022.01) | |
| *B01F 35/71* | (2022.01) | |
| *B01F 101/14* | (2022.01) | |

(52) U.S. Cl.
CPC .......... *A47G 19/2272* (2013.01); *A47J 43/27* (2013.01); *B01F 23/451* (2022.01); *B01F 25/312* (2022.01); *B01F 25/31242* (2022.01); *B01F 35/7161* (2022.01); *B65D 47/06* (2013.01); *B65D 51/2821* (2013.01); *B65D 81/3222* (2013.01); *A23V 2002/00* (2013.01); *B01F 2101/14* (2022.01)

(58) Field of Classification Search
CPC ........ B65D 1/02; B65D 77/28; B65D 47/061; B65D 41/0414; B65D 85/72; A23V 2002/00; A47J 43/27
See application file for complete search history.

(56) References Cited

U.S. PATENT DOCUMENTS

| | | | | |
|---|---|---|---|---|
| 9,498,086 | B2* | 11/2016 | Waggoner | B65D 51/2892 |
| 9,771,195 | B2* | 9/2017 | Lawson | B65D 47/32 |
| 9,795,242 | B2* | 10/2017 | Waggoner | A47J 31/005 |
| 10,189,617 | B2* | 1/2019 | Irizarry | B65D 47/243 |
| 10,251,516 | B2* | 4/2019 | Casey | A47J 43/27 |
| 10,327,451 | B2* | 6/2019 | Gazenko | A23C 9/122 |
| 10,414,549 | B2* | 9/2019 | Hirst | B65D 35/46 |
| 10,524,597 | B2* | 1/2020 | Sorensen | A47G 19/2272 |
| 10,568,462 | B2* | 2/2020 | Casey | A47J 43/27 |
| 10,737,845 | B2* | 8/2020 | Hirst | B65D 35/46 |
| 10,843,142 | B2* | 11/2020 | Waggoner | B01F 15/00149 |
| 10,888,826 | B2* | 1/2021 | Waggoner | B01F 5/0491 |
| 2010/0213085 | A1* | 8/2010 | Belnap | A61J 1/2093 206/219 |
| 2010/0213223 | A1 | 8/2010 | Ballentine | |
| 2010/0260007 | A1* | 10/2010 | Harman | A61K 9/122 366/176.1 |
| 2011/0032788 | A1* | 2/2011 | Hofte | B01F 15/0203 366/130 |
| 2014/0334252 | A1* | 11/2014 | Harand | B01F 3/12 366/348 |
| 2014/0336610 | A1* | 11/2014 | Michel | A61J 1/2089 604/500 |
| 2014/0356501 | A1* | 12/2014 | Juris | A47J 31/20 426/433 |
| 2015/0090711 | A1* | 4/2015 | Peterson | A61J 9/0669 220/4.07 |
| 2015/0092513 | A1* | 4/2015 | Folkner | B01F 3/0876 366/340 |
| 2015/0307265 | A1* | 10/2015 | Winn | C02F 1/002 426/66 |
| 2015/0336722 | A1* | 11/2015 | Brook-Chrispin | B65D 51/28 215/228 |
| 2016/0120372 | A1* | 5/2016 | Lancellotti | B01F 3/08 366/182.1 |
| 2016/0317985 | A1* | 11/2016 | Mutschler | A23L 2/52 |
| 2017/0112310 | A1* | 4/2017 | Davies | A47G 19/2266 |
| 2017/0121077 | A1* | 5/2017 | Lawson | B65D 47/12 |
| 2017/0232406 | A1* | 8/2017 | Waggoner | B01F 5/0495 222/145.6 |
| 2018/0127196 | A1* | 5/2018 | Edwards | A61M 15/0043 |
| 2018/0289205 | A1* | 10/2018 | Novak | B01F 15/0206 |
| 2019/0039793 | A1* | 2/2019 | Irizarry | B65D 81/3222 |
| 2019/0282979 | A1* | 9/2019 | Noall | B01F 5/0428 |
| 2019/0291065 | A1* | 9/2019 | Waggoner | B01F 5/0491 |
| 2020/0016551 | A9* | 1/2020 | Waggoner | B65D 47/06 |
| 2020/0060466 | A1* | 2/2020 | Hughes | A47J 31/407 |
| 2020/0113370 | A1* | 4/2020 | Noall | A45F 3/16 |
| 2020/0122912 | A1* | 4/2020 | Hui | B65D 77/286 |
| 2020/0139312 | A1* | 5/2020 | Belcher | A23L 2/54 |
| 2020/0139313 | A1* | 5/2020 | Waggoner | B01F 3/0865 |
| 2020/0156020 | A1* | 5/2020 | Waggoner | B01F 3/0865 |
| 2020/0361679 | A1* | 11/2020 | Le Reverend | B65D 1/323 |
| 2021/0060503 | A1* | 3/2021 | Waggoner | B01F 3/0865 |
| 2021/0252464 | A1* | 8/2021 | Waggoner | A47J 43/27 |

FOREIGN PATENT DOCUMENTS

| | | |
|---|---|---|
| WO | 2018156816 A1 | 8/2018 |
| WO | 2019147715 A1 | 8/2019 |

OTHER PUBLICATIONS

Australian Patent Office, "Third Examination Report," for Australian patent application No. 2019280070 dated Jun. 25, 2021.

Australian Patent Office, "Notice of Acceptance," for Australian patent application No. 2019280070 dated Jul. 9, 2021.

Chinese National Intellectual Property Administration, "First Office Action," Chinese Application No. 2020100410783, dated May 6, 2021.

Australian Patent Office, "First Examination Report," for Australian patent application No. 2019280070 dated Jun. 29, 2020.

European Patent Office as International Searching Authority, "International Search Report and Written Opinion," International application No. PCT/US2019/014811, dated May 3, 2019.

Chinese National Intellectual Property Administration, "Second Office Action," Chinese Application No. 202010041078.3, dated Dec. 31, 2021.

* cited by examiner

WATER BOTTLE DEVICE ASSEMBLY

CROSS-REFERENCE TO RELATED APPLICATIONS

This application claims priority to U.S. Provisional Patent Application No. 62/620,817 entitled BOTTLE ASSEMBLY filed Jan. 23, 2018, which is incorporated herein by reference in its entirety.

The U.S. patent application Ser. No. 16/162,371 entitled HYDRATION PACK INFUSER filed on Oct. 16, 2018, is incorporated herein by reference in its entirety.

TECHNICAL FIELD

This disclosure relates generally to a bottle assembly for adding a substance to a direct line of flow and, more specifically, adding a flavor mix directly into the line of flow of water rather than directly into a reservoir which may be a water bottle or hydration pack. The assembly may be used to integrate more than strictly flavor to the line of flow of a liquid or gas and may be adjusted by a user.

BACKGROUND

Many different elements and devices have been utilized to add a substance to water to make the water more flavorful by adding flavor to the water. Most uses of flavor adding devices often require that you add the flavor to the entire reservoir of water, which is often a water bottle, so that the water takes on the flavor additive. Squeeze bottles, powders and other concentrates have all been utilized to adding flavor to water whether it is in a hydration pack, water bottle or other reservoir. A user typically has to remove a cap to the reservoir, or water bottle, and add or apply the flavoring to the water.

Current devices fail to provide a user an option of adjusting the additive to adjust flavor or other additive mix. Additionally current devices fail to offer an individual the ability to mix the water in the line of flow and not the entire reservoir of water. The following description provides the ability to overcome the shortcomings of current devices and additive options.

It is also well established that a Venturi effect takes place when fluid flows through a restricted area, the fluid pressure is reduced and fluid velocity is increased. A "Venturi" has been established and commonly used to mix gases or liquids into a system when, for example, one liquid flows through the Venturi and uses the energy of a first liquid to entering a converging, a chamber and a diffuser. The first liquid may enter the converging nozzle thus decreasing the pressure and pulling the second liquid into the flow of the fluid going through the converging nozzle and mixing the first and second liquids together.

A system that is not bulky, and takes up little space that may be integrated with a standard water bottle reservoir would provide a user a better additive experience with flavor or other additives. A system would also provide a better and more efficient user experience which system may include its own water bottle reservoir with a specialized cap or housing that may house the additive and the ability to manipulate the amount of additive from the cap or housing.

SUMMARY

A device, or bottle assembly, or vessel, is an attachment piece for a bottle or other container which allows the user to directly mix flavor, electrolytes, medications, nutrition or other substances directly in the line of flow of the liquid or gas. The user may then activate the substance and control the intensity, or mix ratio, of the substance into the liquid or gas by the turn of a dial or switch. The dial may be adjusted pre-flow, post-flow and may also be adjusted mid flow or be shut off entirely.

The vessel, or vessel assembly, may include a stainless steel double-wall vacuum insulated bottle, coupled with a specially designed lid/cartridge assembly that includes several unique features. A few of those features may include a mouthpiece that can be opened and closed to seal the bottle or allow for easy drinking of the liquid contents in the bottle. A cartridge which may contain a flavoring mix may be removably inserted in the side of a housing of the lid to allow a user to mix flavoring or other substances with the substance in the bottle. The liquid flavoring mix may be concentrated.

The cartridge may include a fill spout and an attached leak proof cap where the flavoring is added to the cartridge. The cartridge spout/cap may be hidden inside the vessel lid, or lid housing, when the cartridge is installed. The lid housing, which may be a lid closure, includes a dial that may function by controlling the ratio of concentrated liquid/flavoring that is pulled into the flow of water as the user drinks through the mouth piece. The user is able to drink pure water or flavored water by moving the dial in one of two directions.

A top surface of the bottle, or the top surface of the lid, may also include a flavor concentration indicator that shows what level the flavor dial is set to. The lid housing may include a curved finger loop that creates an ergonomic feel, while drinking or carrying the vessel. The vessel lid may include a standard (60 mm×4.0 mm pitch) diameter thread that is compatible with most standard wide mouth water bottles to allow a user to easily transfer the vessel lid to a different water bottle. The lid assembly may be easily threaded on or off of the vessel bottle for easy refilling of a liquid of a user's choice (i.e. water).

A silicone gasket may be nested inside the threaded portion of the lid, which eliminates leaks, and reduces the torque required to seal the bottle. Upon removing the lid from the bottle, a long straw may be visible that pulls the water from the bottle while in an upright position. The straw is connected to the lid via a one-way valve, which prevents any flavored water or flavor mix from returning to the bottle. This feature also eliminates backwash from a user, who can also use the vessel if they learn to suck with enough force to actuate the flavor mixing mechanism. Other internal mechanisms are discussed in detail in herein, including the venturi mechanism, mixing chamber, and needle valve, which include features and seals that interface with the flavor dial and cartridge.

DESCRIPTION

The illustrations provided herein provide a list of elements or materials and the assembly of those elements into the device assembly that allow for a user to infuse an additive into the line of flow of a substance. The device assembly may include an additive that is integrated, or attached, or connected to the device assembly that allows a user to infuse the additive into the substance. The user may be able to adjust the additive that is added to the substance to the user's prerogative.

Referring to FIGS. 1-7, a device assembly 10, or vessel assembly, or device, or assembly, or water bottle, is depicted with a vessel 12, or reservoir, and a lid 14 in a closed configuration with the lid 14 reversibly secured to the vessel 12. The vessel 12 may be liquid tight or air tight and capable of maintaining a liquid or gas. The vessel 12 may be substantially cylindrical with a closed base 16 and an opening 18 opposite the base 16. The lid 14 may engage with the opening 18 sealing the vessel 12 to the lid 14. The device 10 may be cylindrical and elongated as is common for water bottles. It will be appreciated that use of the terms "top," and "bottom" or "base" will have the meanings as reasonable set forth for a water bottle with a bottom and a top with the top having an access point, opening or spout to the water bottle.

The lid 14 may include a base portion open to the vessel 12. The lid 14 may also be substantially cylindrical and include a handle 20, or finger loop, for ease in carrying the device 10. The handle 20 may extend from the back of the lid 14 and extend distally away from the body of the lid 14. The handle 20 may include a void 22 between a distal tip of the handle and the body of the lid 14 and may allow for a user's finger(s), or mechanical element such as a cord or a chain, to pass through the void 22 to hold onto the device 10.

A top surface 24 of the lid 14 may be substantially flat and may include a mouthpiece 26 and an indicator 28. The mouthpiece 26 may be substantially rectangular and comprise a longitudinal length that is longer than its width. Two barbs 25 may protrude toward a proximal end of the mouthpiece and are configured to engage with the lid and allow the mouthpiece to rotate or pivot from an open configuration to a closed configuration. Additionally, the mouthpiece 26 may be flat and fit within a recess 27 (see FIG. 8) within the lid 14. The mouthpiece 26 may be secured to the lid 14 one end of the mouthpiece 26 at a pivot that may allow the mouthpiece 26 to pivot from a closed configuration to an open configuration (see FIG. 10 and FIG. 11). The mouthpiece 26 may take a rounded shape or rectangular shape when in cross-section. A nob 30, or ridge, may protrude from the mouthpiece 26 in an upward direction when the mouthpiece is in a closed configuration. The nob 30 may allow a user to easily move the mouthpiece 26 to an opened and closed configuration with a single finger by applying force on the nob 30 from one direction and then the other direction depending on which configuration is desired. A proximal end of the mouth piece may engage with the lid 14 while the distal end is intended for the user to access the liquid through sucking on the mouthpiece 26.

The lid 14 may further include a cartridge assembly 32 which may be configured to be inserted into the lid 14. The cartridge assembly 32 may include a cartridge 40, and may fit within a side of the lid 14 and slide into place so as to create a flush surface with the side of the lid 14. Opposite the cartridge assembly 32 is a dial 34 which may be positioned in or on the side of the lid 14 and underneath the handle 20 when the device 10 is in an upright position. The dial 34 may be manipulated in a clockwise or counter-clockwise manner relative to the cylindrical shape of the lid 14 to allow a user to manipulate the cartridge assembly 32 to disperse or infuse more or less additive into the line of flow of the liquid from the vessel 12 of the device 10. One example may include a clockwise movement to increase the ratio of additive or concentrated flavor and counterclockwise movement to reduce the additive or flavor ratio, or turn the device off entirely. The indicator 28 allows a user to see either the dial 34 position or a visible display of the concentration of the additive being added to the first liquid.

The indicator 28 may provide a visual for a user to see the amount of additive that is being added to the liquid. The indicator 28 may allow a user to see the placement of the dial and know the amount of additive that is going into the line of flow. Alternatively, the indicator 28 may be an additive concentration indicator that shows a concentration of additive from the placement of the dial 34 from the top surface 24 of the lid 14.

Figure 1:
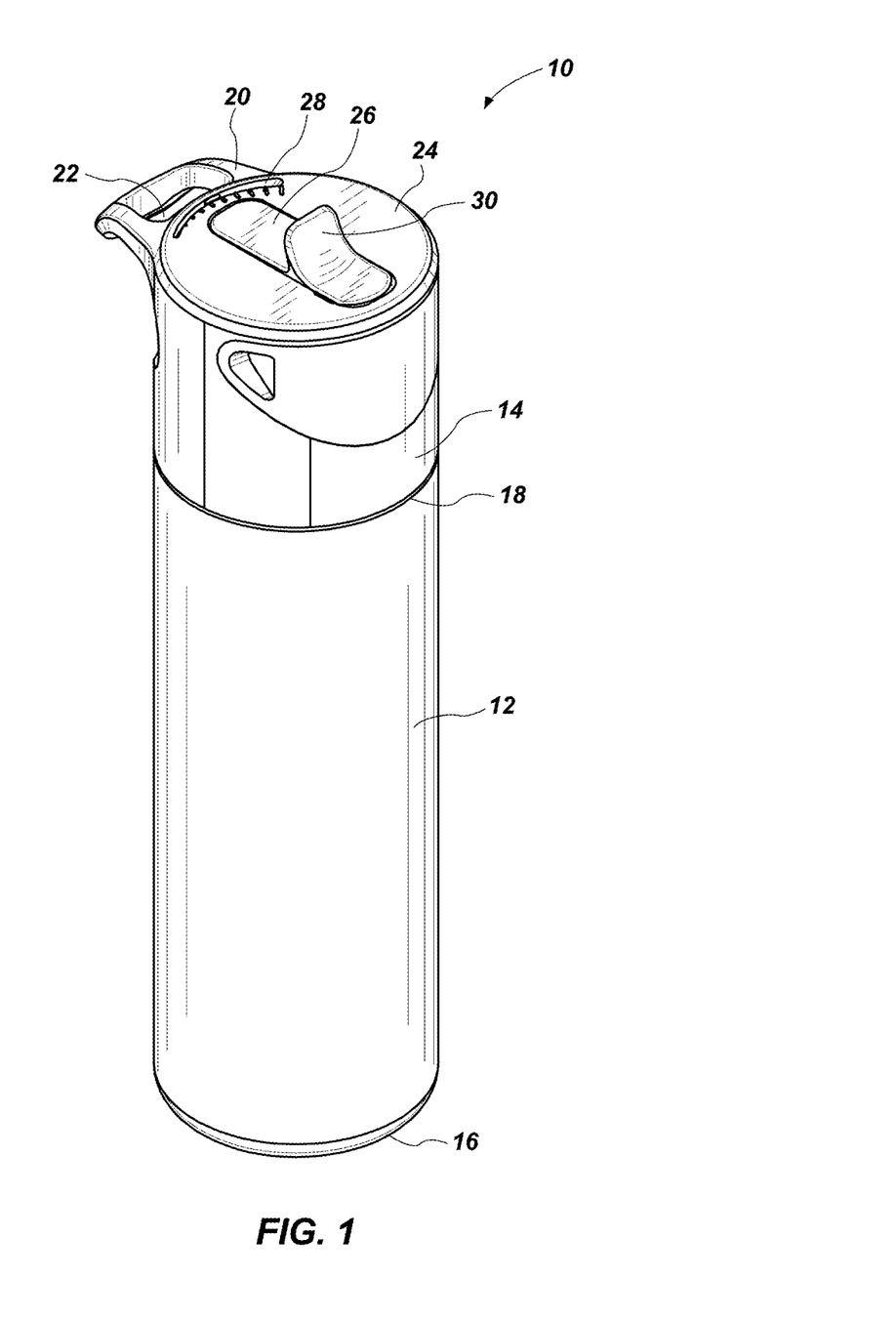
FIG. 1 illustrates a perspective view of the vessel assembly, or bottle assembly, or device, with a lid and a vessel.
Figure 2:
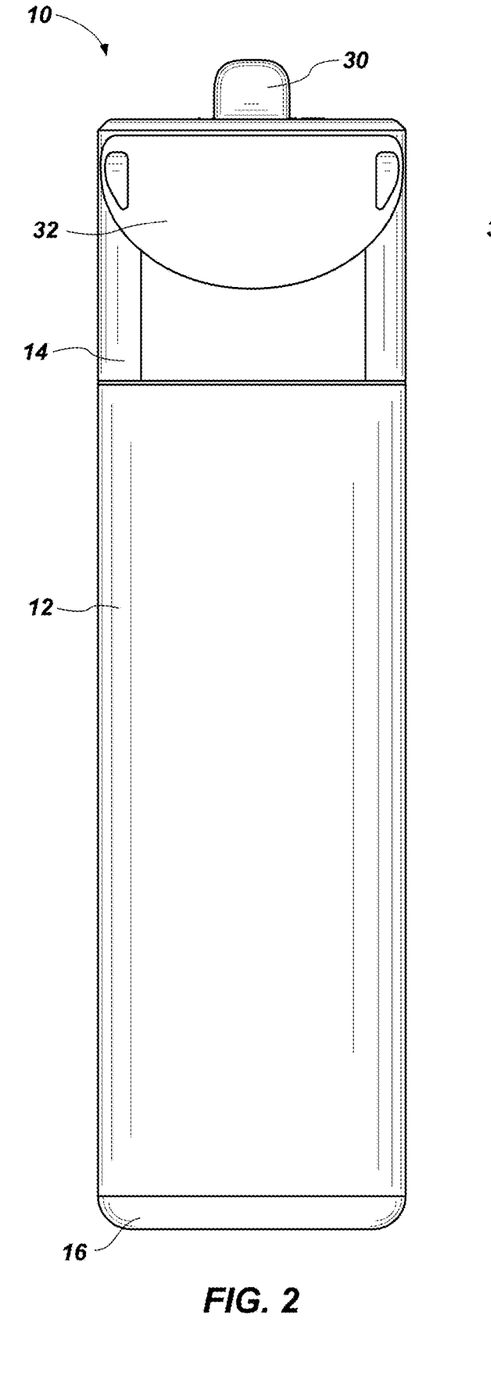
FIG. 2 illustrates a front view of the vessel assembly of FIG. 1.
Figure 3:
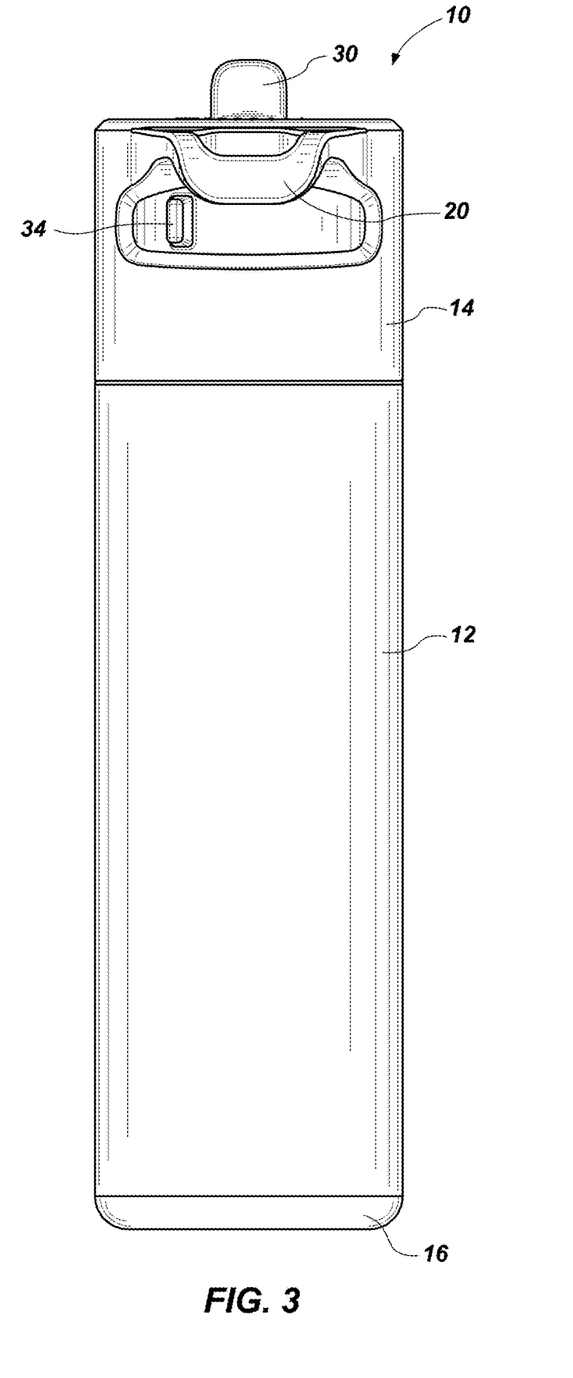
FIG. 3 illustrates a back view of the vessel assembly of FIG. 1.
Figure 4:
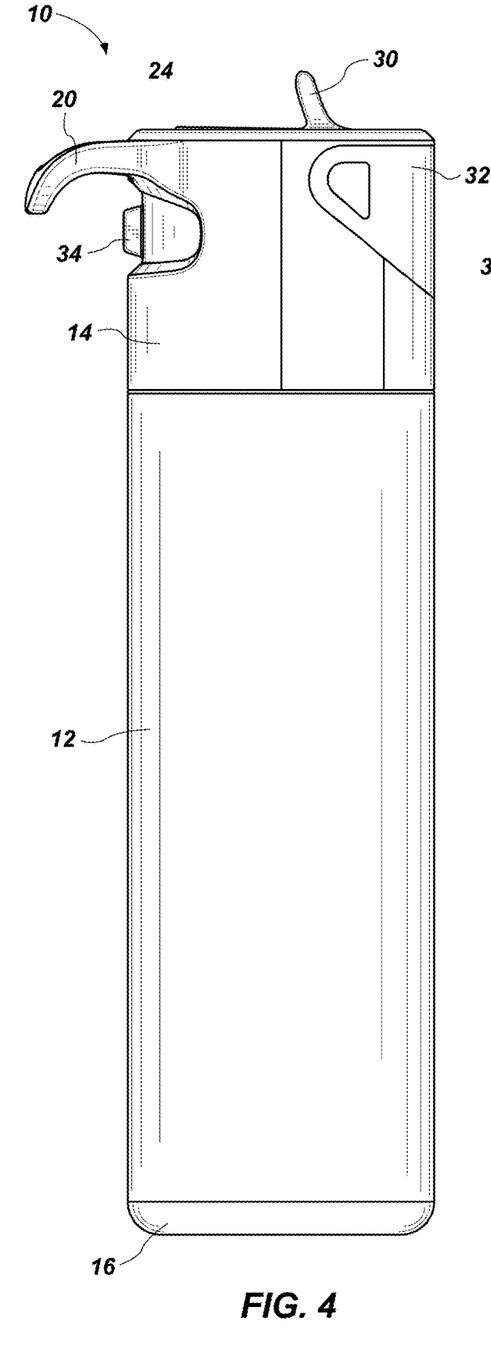
FIG. 4 illustrates a first side view of the vessel assembly of FIG. 1.
Figure 5:
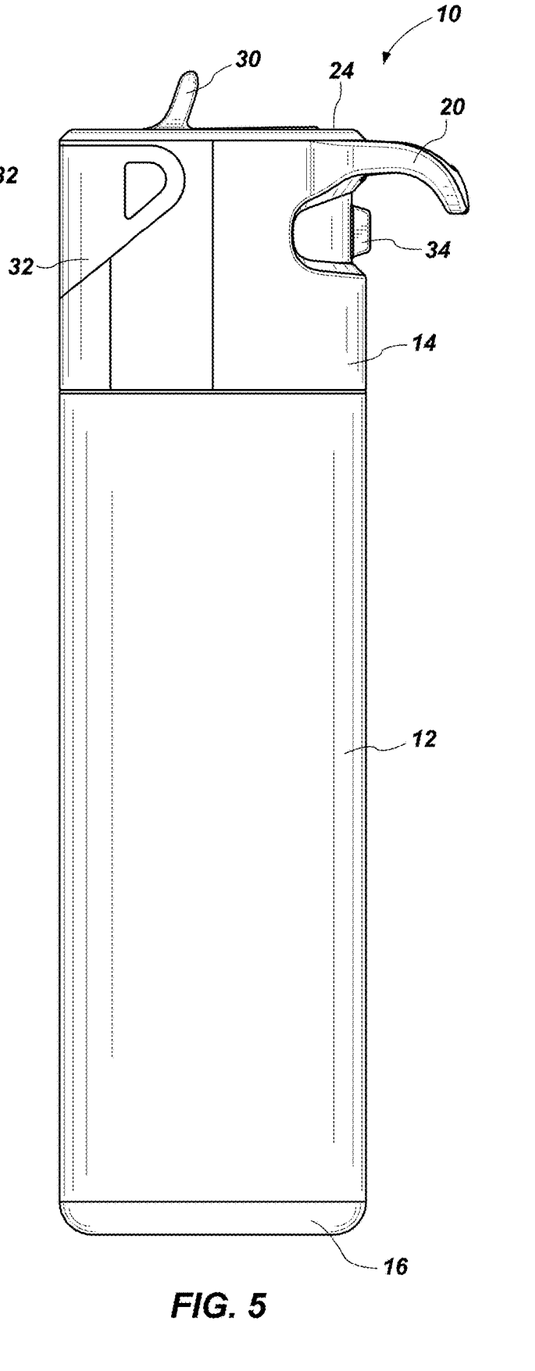
FIG. 5 illustrates a second side view of the vessel assembly of FIG. 1.
Figure 6:
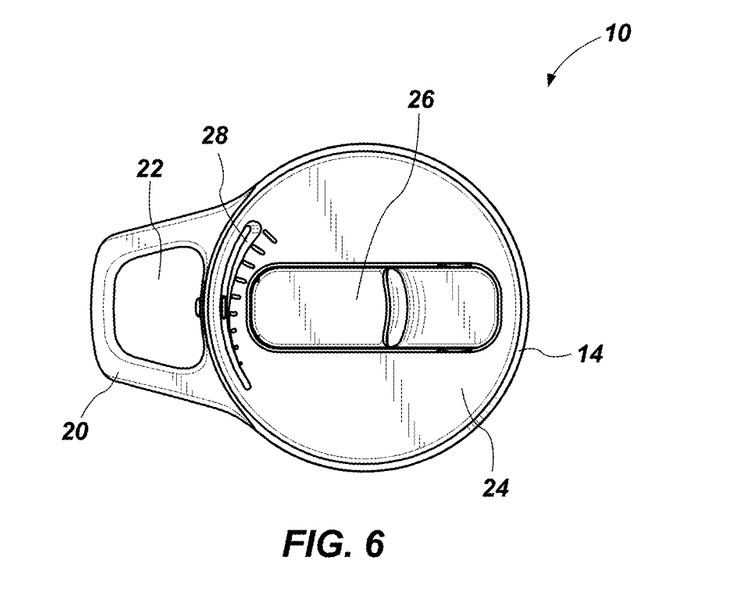
FIG. 6 illustrates a top view of the vessel assembly of FIG. 1.
Figure 7:
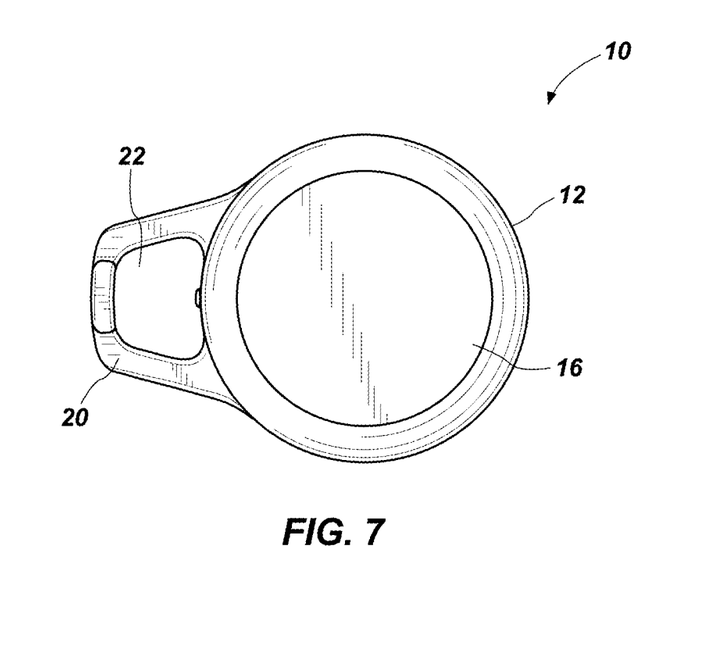
FIG. 7 illustrates a bottom view of the vessel assembly of FIG. 1.
Figure 8:
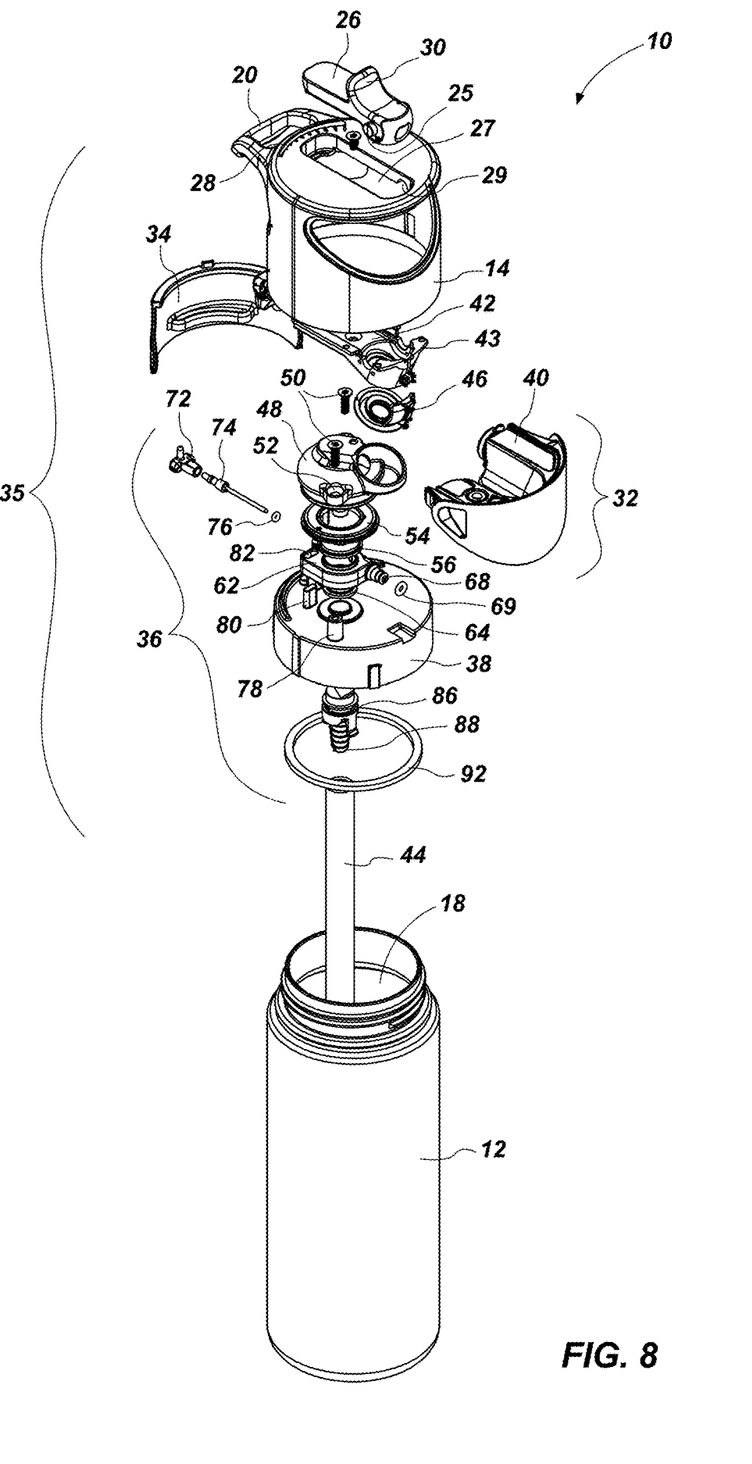
FIG. 8 illustrates first exploded side view of the vessel assembly of FIG. 1.
Figure 9:
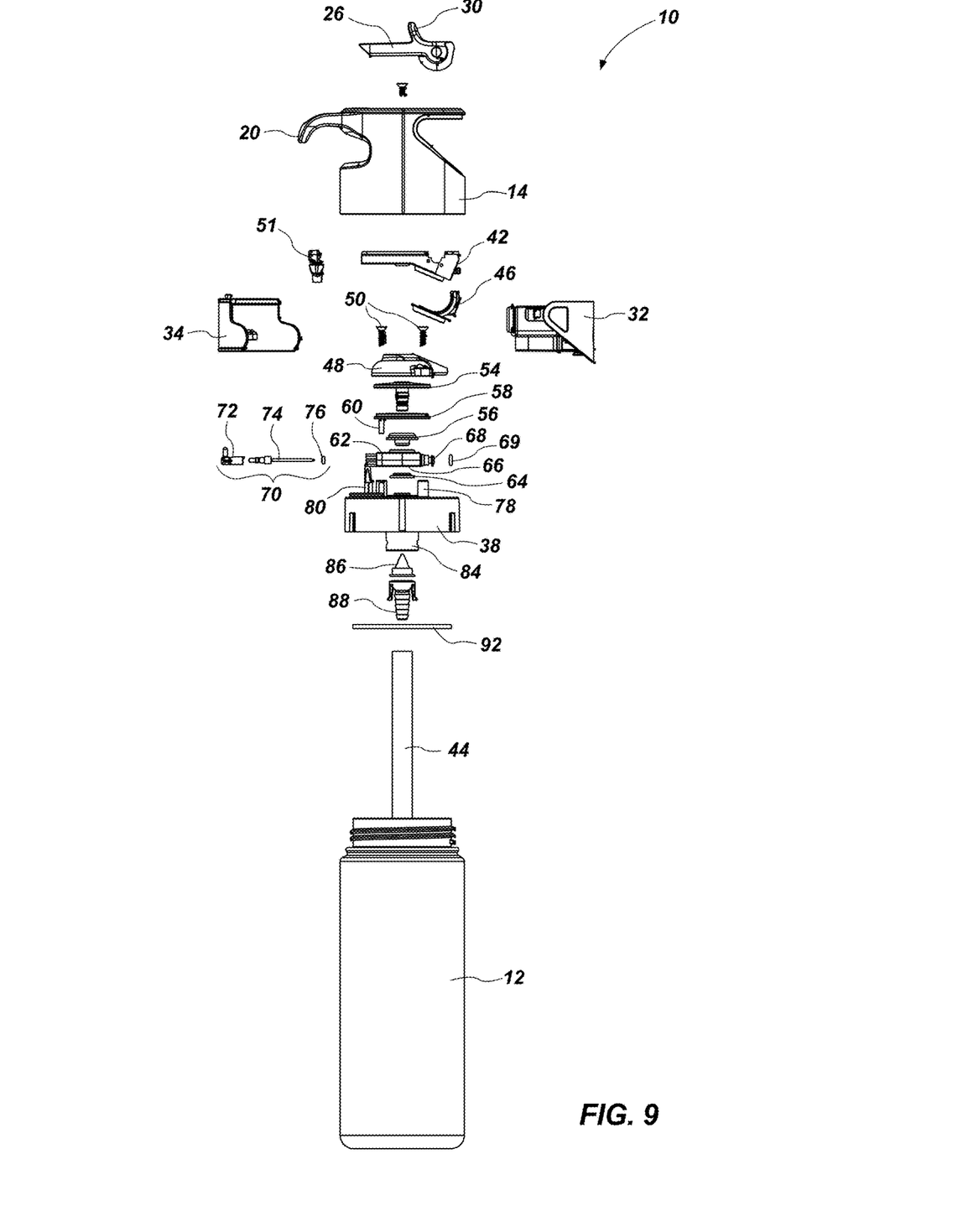
FIG. 9 illustrates a second exploded view of the vessel assembly of FIG. 1.

Referring to FIGS. 8 and 9, a lid assembly 35 with a Venturi system 36 is depicted. The Venturi system 36 may include a series of components that all interact and reside within the lid 14 of the device 10. A lid base 38 may be a component part that engages with the vessel 12 and engage and secure the Venturi system 36. The Venturi system 36 may be positioned between the lid base 38 and the top of the lid 14. The body of the lid 14 may be a single molded part that includes openings or windows for the dial 34 and a cartridge assembly 32. These openings may be on opposing ends of the body of the lid 14. Additionally the Venturi system may be in a vertical orientation when the device 10, is in an upright, or vertical, configuration.

The dial 34 may include a plate that resides within the lid 14 housing with the same radius of curvature as the lid. The dial may be held against the internal perimeter of the lid 14 by the positioning of all the components further described herein.

The recess 27 may include two cutouts 29 that are configured to fit with the two barbs 25 of the mouthpiece to allow the mouthpiece to pivot or rotate between an opened and closed configuration. Directly beneath or below the recess 27 in the top surface 24 of the lid 14 is a retainer 42 to hold a straw 44 to be in fluid communication with the mouth piece 26. The recess 27 may include a hole that allows for passage of a screw. The screw is configured to engage the hole, which may be threaded, in the retainer 42 with the top of the lid 14 and thus secure the retainer against the top of the lid. The mouth piece 26 may be tubular with an opening in one end for a user to access the fluid and the other end that is in fluid communication with the straw 44 which is in communication with the Venturi system 36 which is in communication with the vessel 12. The straw retainer 42 may further include a straw seal 46 that resides on the underside of the straw retainer 42 and may be secured through a frictional fit, snap fit, screw fit or additionally the straw retainer may have a flange extending from one end and the straw seal 46 may have a protrusion that is intended to "hook" the flange and curve around the end of the straw retainer 42 to the bottom side of the straw retainer 42 to create the seal. The straw seal 42 may have a radius of curvature that allows it to sit and seal against an outlet manifold. The straw retainer 42 comprises a longitudinal body with an extension 43 protruding from one end. The extension 43 may engage the underside of the top surface 24 of the lid 14 and thus engaging with a proximal end of the mouth piece 26. Each of the retainer 42 and seal 46 include an opening, which may be aligned, which may be central to the seal 46, to allow fluid to pass there through, while not leaking into other areas of the lid 14.

An outlet manifold 48, or manifold, may engage the lid base 38 via screws 50 that may pass through flanged openings 52, configured to receive the screws 50, wherein the flanged openings are positioned on longitudinal opposite ends of the manifold 48. The manifold 48 may be, at least partially, cylindrical and may be the distal end of the Venturi system 36. The manifold 48 may include an opening biased toward one side of the manifold 48 and may be of sufficient size and shape to fit the straw seal 46 and create a seal between the manifold 48 and the straw retainer 42.

A Venturi 54 may be positioned under, or below, the outlet manifold 48 with a rolling seal 56 positioned under or below the Venturi 54. However, the rolling seal 56 may circumferentially engage the Venturi 54 such that the rolling seal 56 at least partially seals the Venturi inlet ports that allow additive to mix with the first liquid (e.g. water). The rolling seal 56 may provide a watertight seal when no additive is being mixed with the first liquid. A diaphragm seal 58 may also circumferentially engage the Venturi 54 and/or the rolling seal 56 providing a further watertight seal to the Venturi 54 and may be positioned between the rolling seal 56 and the distal end of the Venturi 54. This system may be closely related to a previously filed U.S. patent application Ser. No. 16/162,371 but in a different configuration so as to be able to utilize the Venturi system 36 within the lid 14 of the device 10, or water bottle. As a user sucks the fluid through the mouth piece, and depending on the positioning of the dial 24, the rolling seal 56 is "rolled" off of the Venturi inlet ports allowing additive to enter the Venturi 54. When a user discontinues sucking the rolling seal 56 is "rolled" onto the inlet ports preventing any further mixing of additive to the first liquid.

The Venturi 54 may comprise a longitudinal tube with a first opening and a second opening. These openings allow for passage of a first fluid through the Venturi. The Venturi also includes ports, transverse to the longitudinal tube, which allow passage of an additive into the longitudinal tube and mixing of the additive to the first fluid. The transverse ports may be covered by the rolling seal 56 and the ports are exposed or "opened" when a user suction activates the diaphragm 58, or sucks the liquid to open the ports to a predetermined amount (by placement of the dial 34) thus "pulling" the additive into the Venturi 54. It will be appreciated that alternative methods are contemplated and not solely a rolling seal, for instance, a sliding seal.

The diaphragm seal 58 may include a tubular extension 60 that is configured to engage with a mixing chamber 62. The tubular extension 60 may help in allowing the diaphragm seal to maintain its position within the Venturi system 36. The mixing chamber 62 may be positioned around the rolling seal 56 and at least a portion of the Venturi 54. The mixing chamber 62 may comprise a port seal 64 with a first mixing chamber opening 66 toward a bottom, or inferior, end of the mixing chamber 62, which allows for passage of the first liquid into the mixing chamber 64, or into the longitudinal tube of the Venturi 54 which is in the mixing chamber 64. The mixing chamber 64 may also include an additive inlet 68 that may extend transverse from the opening 66. The inlet 68 may extend from the mixing chamber 64 toward the cartridge assembly 32. An inlet seal 69, or O-ring, may be positioned toward a distal end of the inlet to engage a cartridge of the cartridge assembly 32.

A nozzle plug 51 is positioned above the retainer 42 and plugs the nozzle of the mouthpiece 26 when in a closed configuration. The nozzle plug 51 may pass from the top surface 24 of the lid 14 below the top surface 24 to engage the retainer 42.

A vessel needle assembly 70 may engage the dial 34. The dial 34 and vessel needle assembly 70 may comprise a gear assembly 72, or ratchet mechanism, that when the dial 34 is turned the vessel needle assembly 70 displaces a needle valve 74 such that more additive or less additive is mixed with the first liquid depending on the directive rotation of the dial 34. The needle valve 74 may include a needle valve seal 76, or O-ring, positioned toward a distal end of the needle valve 74. Alternatively, the dial 34 may comprise a small tab that interfaces with a gear to give tactile feedback of the fluid and prevent the dial 34 from inadvertently moving from its setting.

The lid base 38 may include at least two screw posts 78 that may extend upward, or superiorly, and displaced from one another, toward the top of the lid 14. The screw posts 78 may be configured to receive the screws 50 that engage the manifold 48. The screws 50 may engage the manifold and then are secured to the lid base 38 to prevent the Venturi system 36 from shifting. Additionally, a third post 80 may extend upward, or superiorly, from the lid base and displaced from the screw posts 78 and may be configured to engage a portion of the mixing chamber 62. The mixing chamber 62 may include an aperture 82 that extends in a vertical direction, or transverse direction from the inlet 68, that is configured to securely fit the third post 80. The third post 80 and aperture 82 are configured to secure the mixing chamber 62 to the lid base 38 and to the Venturi system 36 as well.

Extending from the bottom of the lid base 38 is a first liquid port 84 which may include a valve 86, which may be a large duckbill valve which prevents the first liquid from going back into the vessel 12, or reservoir so there is no contamination of the reservoir 12 with additive, or "backwash" from a user drinking from the device 10. The valve 86 may include a valve top 88, which extends toward the bottom of the device 10. The valve top 88 may include barbs that are configured to engage and hold a straw 44 that may extend from the valve top 88 into the vessel 12, or reservoir, with the first liquid. The barbs may prevent easy withdrawal of the straw 44 from the valve top 88. The valve 86 may reside within the port 84, and the port 84 with the valve 86 may extend through a washer seal 92 that engages with the bottom of the lid base 38. The washer seal 92 may include an opening for port 84 to extend through and particularly at least a portion of the valve top 88. The straw 44 engages the valve top 88 and extends downward to communicate with the first liquid. The washer seal may frictionally engage the lid base; it may be screwed into place, snapped into position or any other well-known means.

The lid base 38 may include threads 94 (see FIG. 10) that extend from a top of the lid base 38 to a bottom of the lid base 38. The threads 94 may be of standard size and fit for and standard wide-mouth water bottle. Likewise the vessel 12, or reservoir, may include complementary threads to engage and create a water tight, or even air tight, fit between the lid 14 and the vessel 12. The threads 94 allow the coupling of the lid 14 to the vessel 12.

Referring to FIGS. 10-13, the device 10 is depicted with the lid assembly 35 intact. Wherein each of the components previously disclosed are in their proper positions for function of the device. Threads 94 show the engagement of the lid 14 to the vessel 12 in a standard, threadable manner.

Figure 10:
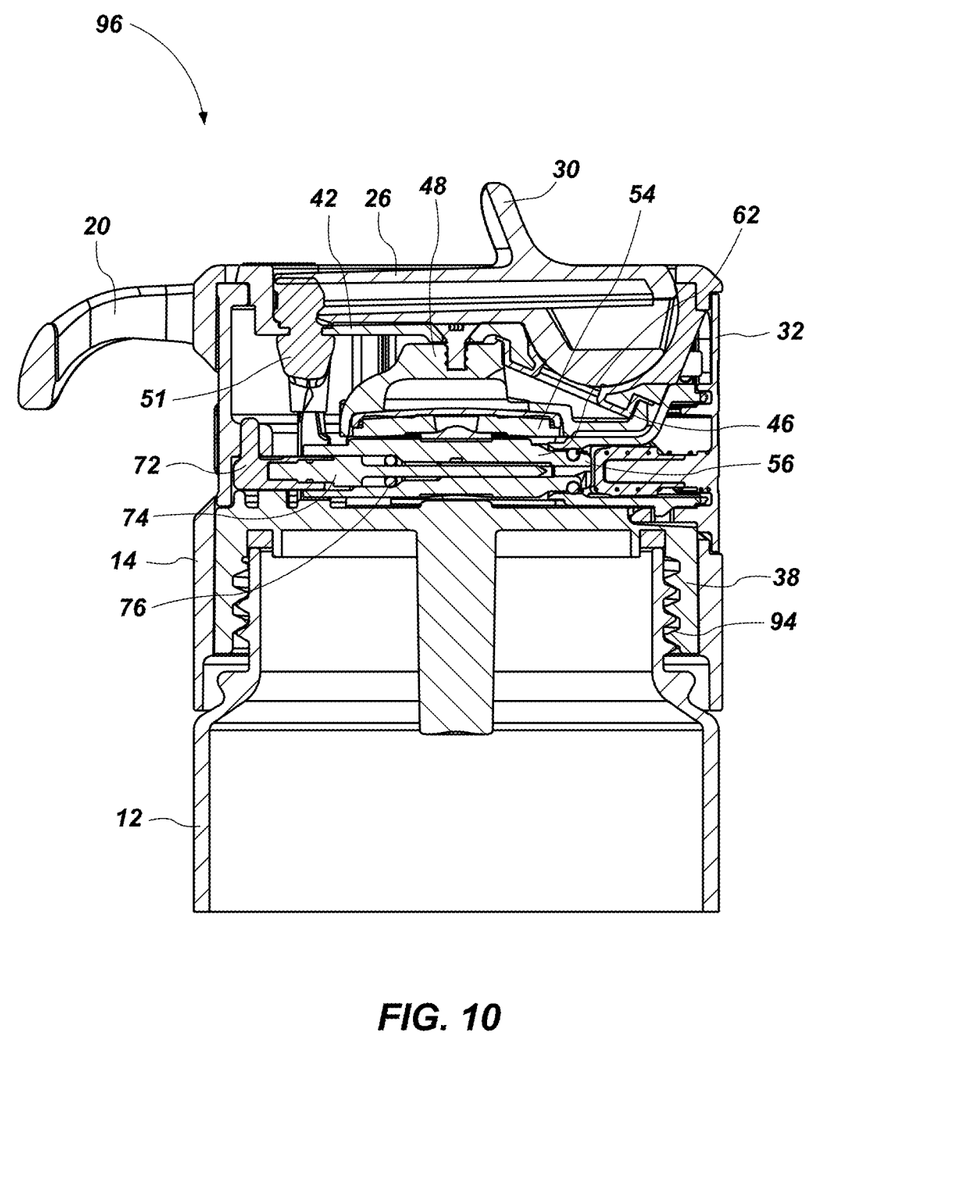
FIG. 10 illustrates a cross sectional side view of the lid and a portion of the vessel of FIG. 1 in a closed configuration.

Referring to FIG. 10, the device 10 is in a closed configuration 96 with the mouth piece 26 laying within the recess 27 of the lid 14. Regardless of the position of the dial 34 no liquid will flow because the mouth piece 26 is closed and no mixing of liquids will occur.

Figure 11:
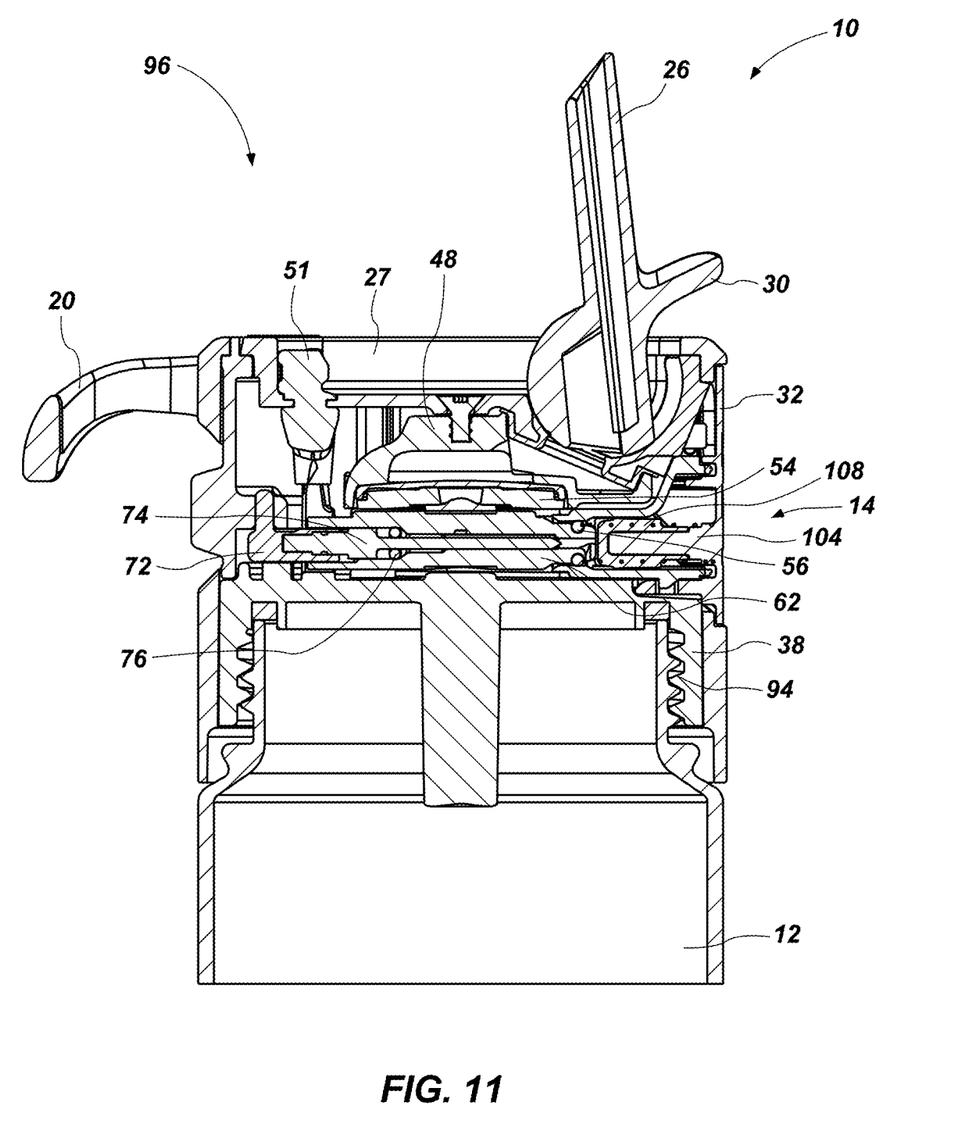
FIG. 11 illustrates a cross sectional side view of the lid and a portion of the vessel of FIG. 10 in an open configuration.

Referring to FIG. 11, the device 10 is in an open configuration 98 wherein the openings within the mouth piece 26 and the mouth piece retainer 42 allow fluid to flow as fluid is accessed throw the manifold 48 of the Venturi system 36.

Figure 12:
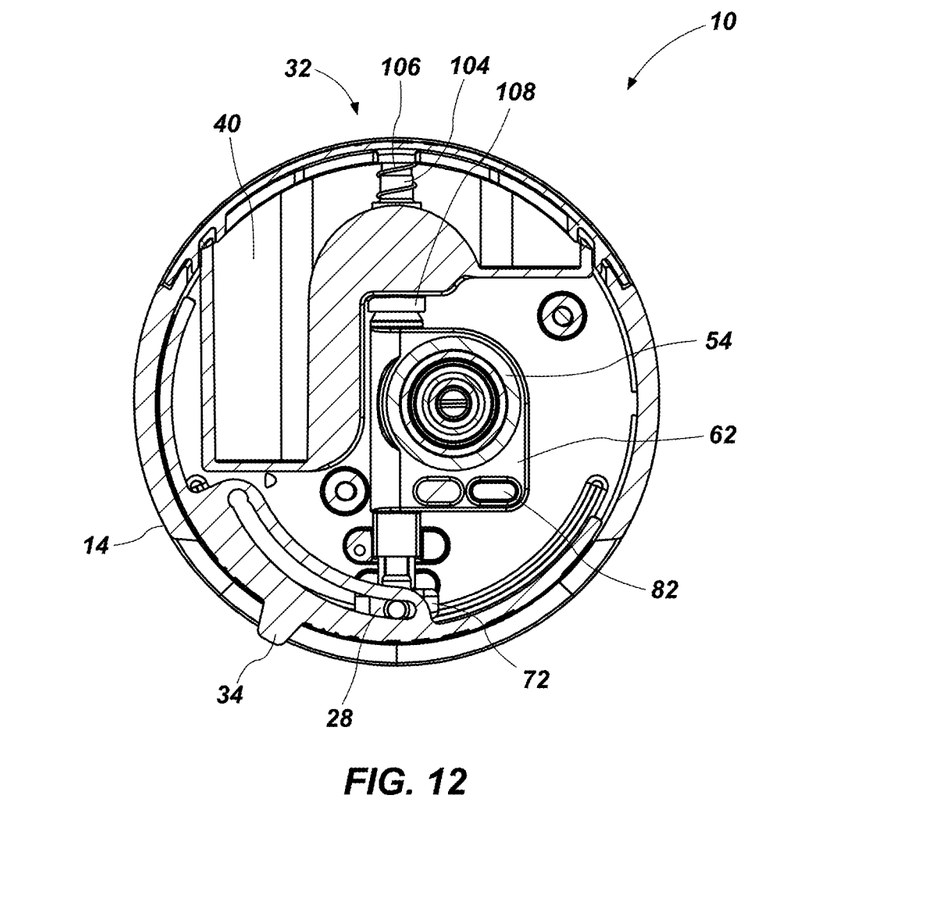
FIG. 12 illustrates a cross sectional top view of the lid of FIG. 1.

Referring to FIG. 12, a top cross sectional view of the lid assembly 35 is depicted with the cartridge assembly 38 in place and the dial 34 in an arbitrary position.

Figure 13:
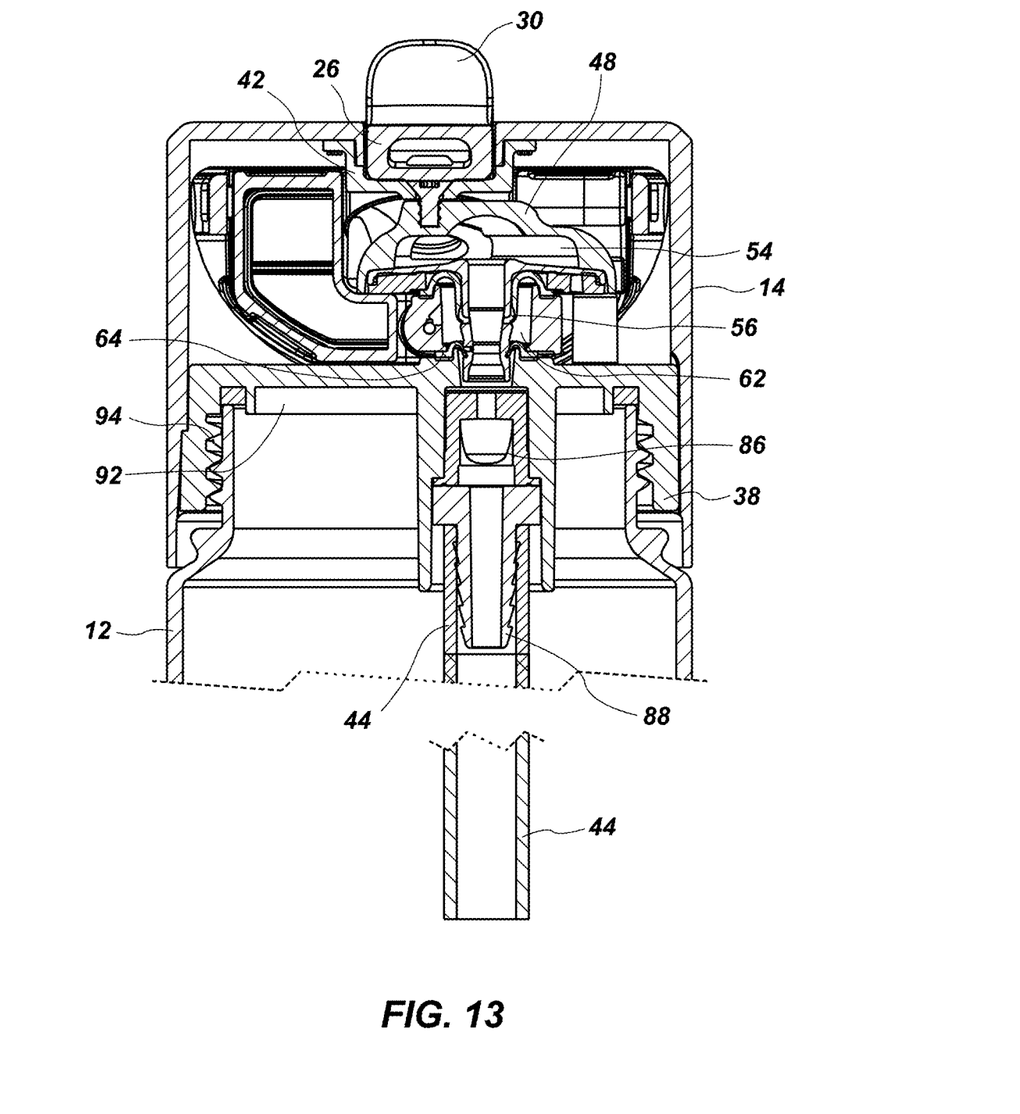
FIG. 13 illustrates a cross sectional front view of the lid and a portion of the vessel of FIG. 1.

Referring to FIG. 13, an alternate cross-sectional side view of the device 10 is depicted. The valve 86 is shown positioned above the valve top 88 and the straw 44 engaged to the valve top 88.

Figure 14:
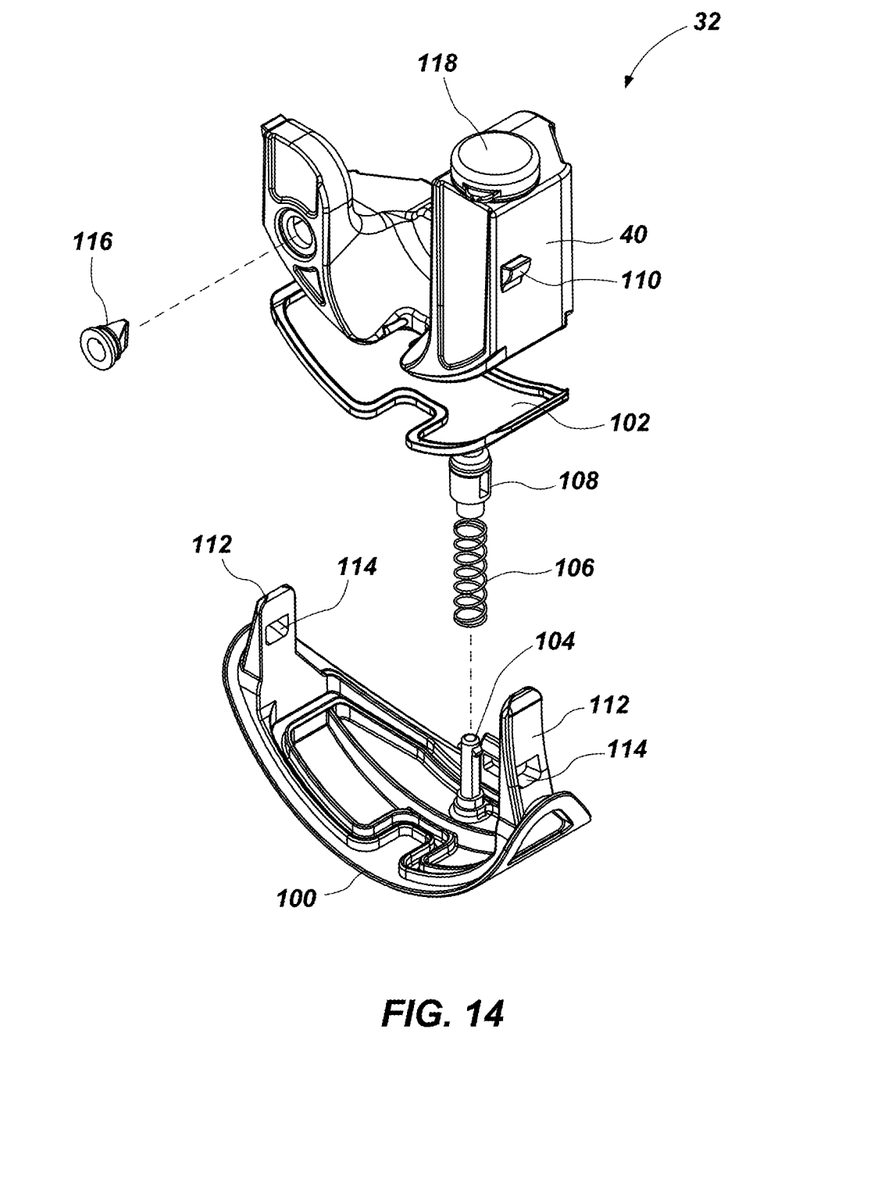
FIG. 14 illustrates an exploded perspective view of a cartridge assembly of the vessel assembly of FIG. 1.

Referring to FIG. 14, the cartridge assembly 32 includes the cartridge 40, which may hold flavoring or concentrated flavoring, a cartridge face 100, which may be an elongated plate with curved ends and a radius of curvature the same as the lid 14, and a gasket 102 positioned between the cartridge 40 and the cartridge face 100. The cartridge face 100 may include a cartridge post 104 extending toward a center axis of the lid 14 (or the center axis of the cartridge face 100 if the cartridge face 100 extended to a full cylinder). The cartridge post 104 may comprise barbs, which may be positioned toward a distal end of the cartridge post 104, extending laterally from the cartridge post 104. A spring 106 may engage the cartridge post and be retained on the cartridge post 104 by the barbs.

A cartridge seal 108 may also engage the spring 106. The cartridge seal 108 may include a shoulder with a post that is configured to fit within the spring 106 while the shoulder acts as a stop so that only the post resides within the spring 106. Referring to FIG. 12, the spring 106 may press the cartridge seal 108 against the additive inlet 68 to keep the cartridge 40 and the mixing chamber 62 engaged so that the additive may be mixed with the first fluid in the Venturi system 36 without spill or leakage.

Additionally the cartridge 40 may include cartridge barbs 110 on one or both sides of the cartridge 40. The cartridge face 100 may include longitudinal protrusions 112, wherein each longitudinal protrusion 112 may include a window 114 to allow the cartridge barbs 110 to engage with such that the cartridge 40 is secured to the cartridge face 100. The longitudinal protrusions 112 may further engage with the lid 14 to secure the cartridge assembly 32 to the lid 14.

The cartridge assembly 32 also includes a cartridge valve 116 which may be a duckbill valve. The cartridge valve 116 may allow for one way addition of additive to the cartridge without reversal of the additive, or liquid, out. Thus the cartridge 40 may be reusable or it may discarded and a new cartridge put in its place. The cartridge 40 further includes a cartridge lid 118. The cartridge lid 118 may be removed and more additive easily added to the cartridge 40. Additionally the cartridge lid 118 can be removed for cleaning or irrigating to allow addition of a different additive. The cartridge lid 118 provides a seal to the cartridge 40 so the additive does not leak.

Figure 15:
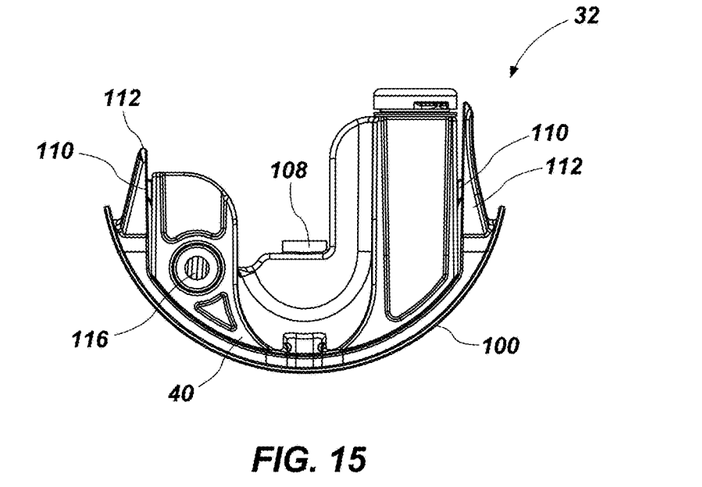
FIG. 15 illustrates a top view of the cartridge assembly of FIG. 14.

Referring to FIG. 15, the cartridge assembly 32 may have a U-shaped appearance from a top view. One arm of the U-shape may include the cartridge valve 116 as previously described while the other arm of the U-shape may include the cartridge lid 118. The base of the U-shape may include the cartridge seal 108 with the spring 106 and cartridge post 104. Opposite the cartridge post 104 but on the internal curvature of the U-shape is a cartridge port 120 which engages the additive inlet 68 of the mixing chamber 62. Herein the needle valve 74 is manipulated by the dial 34 thus allowing more or less additive to enter the mixing chamber 62. The U-shape of the cartridge 40 and the cartridge assembly 32 allows for the cartridge assembly 32 to fit (and/or slide) around the Venturi system 36 when positioning the cartridge assembly 32 within the lid 14, thus and fit within a reasonable amount of space within the device 10.

Figure 16:
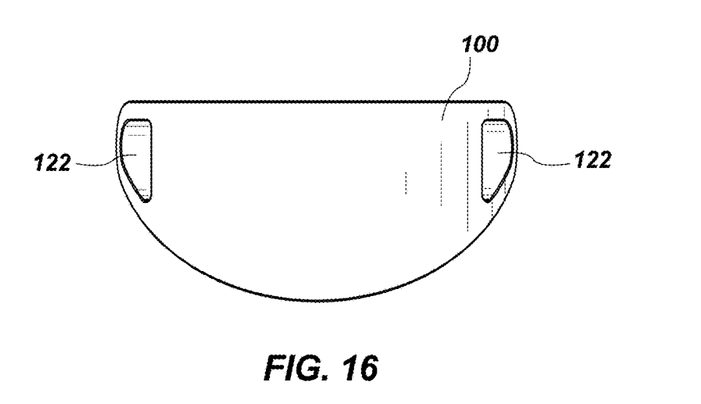
FIG. 16 illustrates a side view of the cartridge assembly of FIG. 14.
Figure 17:
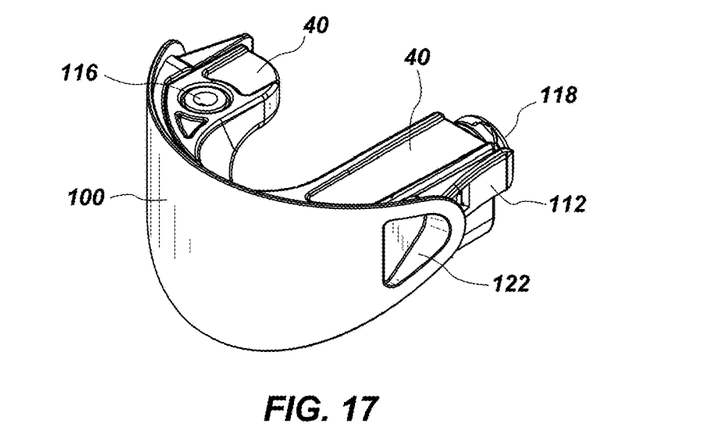
FIG. 17 illustrates a perspective view of the cartridge assembly of FIG. 14.

Referring to FIGS. 16 and 17, the cartridge face 100 may include cartridge recesses 122 that on either side of the cartridge face 100. Each of the recesses 122 may be positioned toward each end of the cartridge face 100 and at such an angle as to allow a user to place fingers (or a finger and a thumb) within the cartridge recesses 122 to easily hold on to the cartridge assembly 32 for easy engagement and disengagement with the lid 14. Each cartridge recess 122 may be tapered and may be extend deeper into the cartridge face 100 as you extend toward each end of the cartridge face 100.

The cartridge assembly 32 may engage the lid 14 by sliding the cartridge assembly non-parallel, or substantially perpendicular, to the longitudinal axis of the device 10. The cartridge assembly 32 may be reversibly secured to the lid via frictional fit, press fit, snap fit, or may include a ridged fit with a complementary design on the window of the lid 14 that requires substantial frictional force to remove the cartridge assembly 32 from the lid 14.

The cartridge 40 may be integrated into the assembly and additional additive may be added to the cartridge 40 by a user when the additive is gone or expires. Alternatively, the cartridge 40 may be removable from the device 10 and additional additive added to the cartridge 40 and then placed back in the device 10. Yet another embodiment may include a cartridge 40 that may attach or connect to the device assembly wherein the cartridge is disposable and additional cartridges can be interchanged.

The device 10 may be modular and other pieces of the assembly may be interchangeable or replaced when desired or required. The device 10 may require a specified reservoir that holds the first liquid or substance (e.g. water) that will mix with the additive (e.g. flavor). Separately, the device assembly may also be easily integrated to a standard water bottle with a standard opening.

While the system may be primarily comprised of a polymers and rubbers it will be appreciated that many of the components considered herein can be manufactured of many different materials including metals, alloys, plastics, rubbers and the like.

Although the foregoing disclosure provides many specifics, these should not be construed as limiting the scope any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A water bottle system for adding an additive to a substance comprising:
   a reservoir for maintaining a substance;
   a lid configured to engage the reservoir; and
   an assembly within the lid for adding an additive to the substance into a line of flow the assembly comprising:
      a cartridge configured to receive an additive and positioned toward a first side of the lid and removable from the first side; and
      an adjustment mechanism configured to adjust the amount of the additive being added to the line of flow, the adjustment mechanism comprising:
         a dial at least partially recessed within the lid, the dial capable of moving in a clockwise and counterclockwise direction positioned on a second side of the lid opposite the cartridge.

2. The system of claim 1 comprising:
   a recess within the lid and a mouthpiece configured to fit within the recess; wherein the mouthpiece is pivotable between an closed configuration and an open configuration.

3. The system of claim 1 wherein the adjustment mechanism comprises:
   a needle valve assembly coupled to the dial and manipulatable by the dial to either increase the amount of additive or decrease the amount of additive relative to the movement of the dial in a clockwise or counterclockwise direction.

4. The system of claim 1 further comprising:
   a straw with a proximal end and a distal end extending from the lid to the reservoir; and
   a duckbill valve coupled to the lid and coupled to a proximal end of the straw.

5. The system of claim 1, wherein the lid and the reservoir comprise complementary threads to couple the lid to the reservoir.

6. The system of claim 1 further comprising:
   a cartridge assembly comprising:
   the cartridge;
   a cartridge port; and
   a cartridge plate;
   wherein the cartridge assembly is insertable into the lid in a transverse direction relative to a longitudinal length of the water bottle assembly.

7. The system of claim 1 comprising:
   a Venturi system with at least one port and a rolling seal wherein the rolling seal circumferentially engages the Venturi system.

8. The system of claim 7, wherein the Venturi system is positioned within the lid.

9. The system of claim 8, wherein the Venturi system is in a vertical orientation with respect to the water bottle system.

10. A water bottle assembly for adding an additive to a substance comprising;
    a vessel configured to hold a first liquid;
    a lid; and
    an assembly for adding an additive to the substance into a line of flow, the assembly comprising:
       a cartridge assembly configured to hold a second liquid and positioned toward a fist side of the lid and removable from the first side is insertable into the lid in a transverse direction relative to the first side of the lid; and
    an adjustment mechanism configured to adjust the amount of the second liquid being added to the first liquid in the line of flow.

11. The assembly of claim 10, comprising: a recess within a top of the lid and a mouthpiece configured to fit within the recess; wherein the mouthpiece is pivotable between an open configuration and a closed configuration.

12. The assembly of claim 10 wherein the adjustment mechanism comprises:
    a dial capable of moving in a clockwise and counterclockwise direction; and
    a needle valve assembly coupled to the dial and manipulatable by the dial to either increase the amount of second liquid or decrease the amount of second liquid relative to the movement of the dial in a clockwise or counterclockwise direction.

13. The assembly of claim 10 further comprising:
    a straw with a proximal end and a distal end extending from the lid to the vessel; and
    a duckbill valve coupled to the lid and coupled to a proximal end of the straw.

14. The assembly of claim 10, wherein the lid and the vessel comprise complementary threads to couple the lid to the vessel.

15. The cartridge assembly of claim 10 further comprising:
    a cartridge within the cartridge assembly, wherein the cartridge maintains the second liquid;
    a cartridge port; and
    a cartridge plate.

16. The assembly of claim 10 comprising:
    a Venturi system with at least one port and a rolling seal wherein the rolling seal circumferentially engages the Venturi system.

17. The assembly of claim 16, wherein the Venturi system is positioned within the lid.

18. The system of claim 17, wherein the Venturi system is in a vertical orientation with respect to the water bottle assembly.

19. The method of infusing a first liquid with a second liquid in a water bottle assembly comprising:
    providing a first liquid in a reservoir;
    engaging a lid with the reservoir, wherein the lid comprises:
       a mouth piece;
       a Venturi system; and
       a straw extending from the lid to the reservoir;
    inserting a cartridge assembly transversely lid wherein the cartridge assembly comprises;
       a cartridge with a second fluid;

manipulating a dial, positioned in the side of the lid on a second side of the lid opposite the cartridge assembly, in a clockwise direction to increase the amount of second fluid; and infusing the second liquid with the first liquid into the line of flow as a user sucks on the mouthpiece.

20. The method of claim 19 further comprising:

manipulating the dial in a counter-clockwise direction to decrease the amount of second fluid; and infusing the second liquid with the first liquid.

\* \* \* \* \*